(12) United States Patent
Maheshwari (10) Patent No.: US 6,922,271 B1
(45) Date of Patent: Jul. 26, 2005

(54) TUNABLE PHASE GRATING WITH OPTICALLY LINEARIZED RESPONSE

(75) Inventor: Dinesh Maheshwari, Fremont, CA (US)

(73) Assignee: Silicon Light Machines, Inc., Sunnyvale, CA (US)

(*) Notice: Subject to any disclaimer, the term of this patent is extended or adjusted under 35 U.S.C. 154(b) by 407 days.

(21) Appl. No.: 10/229,858

(22) Filed: Aug. 27, 2002

(51) Int. Cl.[7] ............................ G02B 26/00; G02B 5/18
(52) U.S. Cl. ...................... 359/290; 359/231; 359/295; 359/572; 359/573
(58) Field of Search .................................. 359/290, 291, 359/231, 295, 563, 566, 569, 570, 571, 572, 573

(56) References Cited

U.S. PATENT DOCUMENTS

| 6,215,579 B1 | | 4/2001 | Bloom et al. | |
| 6,268,952 B1 | * | 7/2001 | Godil et al. | 359/291 |
| 6,445,502 B1 | * | 9/2002 | Islam et al. | 359/571 |
| 2003/0035215 A1 | * | 2/2003 | Amm et al. | 359/572 |

OTHER PUBLICATIONS

Corrigan, Robert, et al. "Silicon Light Machines—Grating Light Valve Technology Brief" Jun. 2001, pp. 1–8; Silicon Light Machines, Sunnyvale, California.

Amm, D.T., et al. "Grating Light Valve Technology: Update and Novel Applications" May 19, 1998, pp. 1–4; Presented at Society for Information Display Symposium, Anaheim, California.

Amm, David T., et al. "Optical Performance of the Grating Light Valve Technology" 1999, pp. 1–8; Silicon Light Machines, Sunnyvale, California.

Corrigan, R.W., et al. "An Alternative Architecture for High Performance Display" Nov. 20, 1999, pp. 1–5; Presented at the 141st SMPTE Technical Conference and Exhibition, New York, NY.

Bloom, D.M., et al. "The Grating Light Valve: revolutionizing display technology" 1997, pp. 1–10; Silicon Light Machines, Sunnyvale, California.

* cited by examiner

*Primary Examiner*—Hung Xuan Dang
*Assistant Examiner*—Tuyen Tra
(74) *Attorney, Agent, or Firm*—Okamoto & Benedicto LLP (57) ABSTRACT

One embodiment disclosed relates to an apparatus for controlled diffraction of light. The apparatus includes a plurality of vertically movable reflective members and an arrangement of the reflective members along a grating plane. The grating plane is configured to be controllably tiltable. Another embodiment disclosed relates to a method for controlled diffraction of light. The method includes illuminating incident light upon an element, and controllably deflecting reflective members within the element to control a fraction of the incident light reflected by the element. The reflective members may be controllably deflected so as to be positioned along a tiltable grating plane.

13 Claims, 7 Drawing Sheets

TUNABLE PHASE GRATING WITH OPTICALLY LINEARIZED RESPONSE

BACKGROUND OF THE INVENTION

1. Field of the Invention

The present invention relates generally to diffractive optical systems. The present invention relates more particularly to diffractive MEMs optical systems used for communication systems or projection displays.

2. Description of the Background Art

Dynamic gain equalizer and other subsystems for optical telecommunication systems may be formed using one or more arrays of light-modulating pixels. The light-modulating pixels may comprise, for example, GRATING LIGHT VALVE (GLV) pixels. In Dynamic gain equalizer, the optical channels in an optical fiber are dispersed over the pixels of the GLV which attenuates the channels in a controlled manner such that at the output of the device all channels have equal power.

In addition to telecommunication systems, such light-modulating pixels may also be used to form a two-dimensional projection. Publications describing GLV devices and their application to display systems include: "The Grating Light Valve: Revolutionizing Display Technology," by D. M. Bloom, Projection Displays III Symposium, SPIE Proceedings, Volume 3013, San Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1990, New York, N.Y.; and U.S. Pat. No. 6,215,579, entitled "Method and Apparatus for Modulating an Incident Light Beam for Forming a Two-Dimensional Image," and assigned at issuance to Silicon Light Machines. Each of the above-mentioned publications is hereby incorporated by reference in its entirety. In such display systems, the linear array modulates an incident light beam to display pixels along a column (or, alternatively, a row) of the two-dimensional (2D) image. A scanning system is used to move the column across the screen such that each light-modulating pixel is able to generate a row of the 2D image. In this way, the entire 2D image is displayed.

Figure 1:
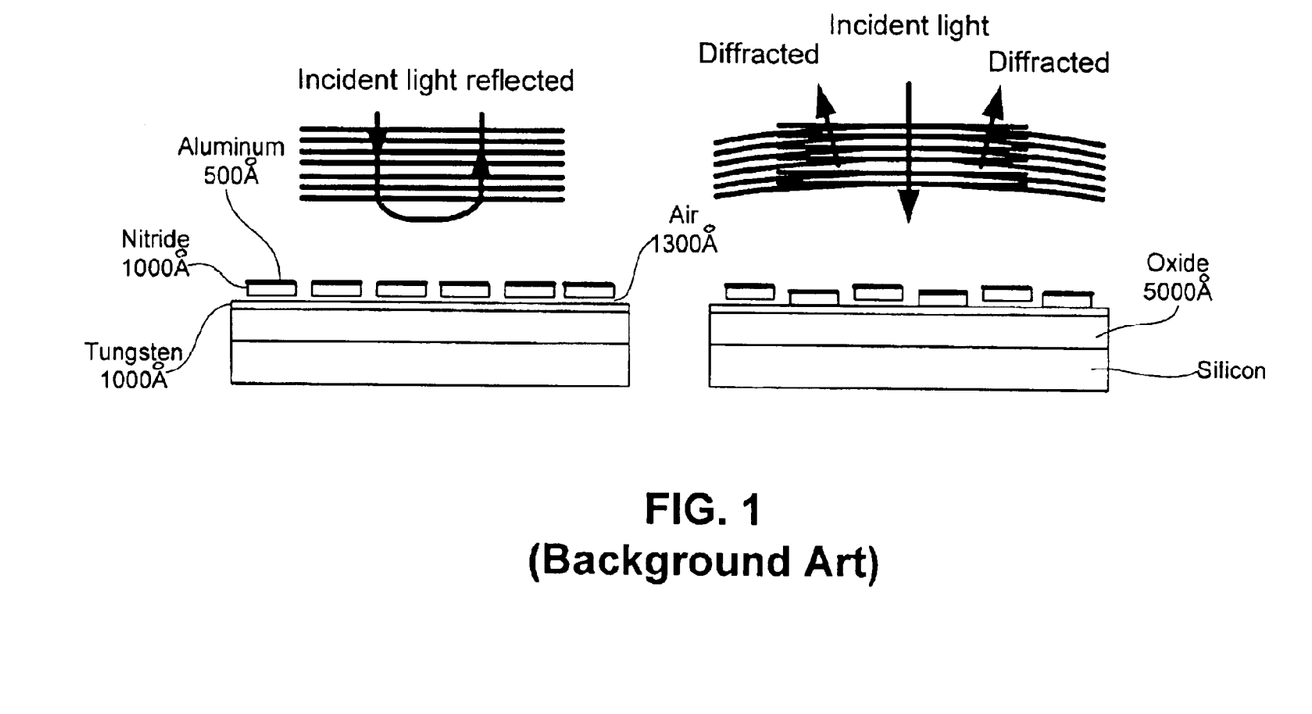
FIG. 1 is a diagram depicting the reflective and diffractive operational states of a conventional GRATING LIGHT VALVE (GLV) element.

FIG. 1 is a diagram depicting the reflective and diffractive operational states of a conventional grating light valve (GLV) element. The left side of the diagram depicts the reflective state, while the right side of the diagram depicts the diffractive state.

In the example illustrated in FIG. 1, the substrate may comprise a silicon substrate with oxide (for example, about 5000 angstroms thick) overlaying the silicon, and tungsten (for example, about 1000 angstroms thick) overlaying the oxide. The reflective members lie above the tungsten with an air space there between. For example, three pairs of reflective members (i.e. six members) are shown. The reflective members may, for example, comprise reflective ribbons comprising nitride (for example, about 1000 angstroms thick) with a reflective layer of aluminum (for example, about 500 angstroms thick) on the nitride. Incident light is beamed onto the reflective members. The incident light beam may be at a perpendicular angle to the plane of the substrate.

In the reflective state (left side), all the reflective members are in the same plane, and the incident light is reflected from the surfaces of the members. This reflective state may be called the zero attenuation state because it may be used to reflect all the light back (minus some system loss) back on the same path as the incident beam.

In the diffractive state (right side), alternate ones of the reflective members are deflected downward. This results in the diffraction of the incident light in a direction that is at an angle to the path of the incident light. This diffractive state may be called the attenuation state because it may be used to attenuate the light reflected back on the same path as the incident beam. As discussed further below, the optical response of the element depends on the amount of downward deflection of the alternate members.

Figure 2:
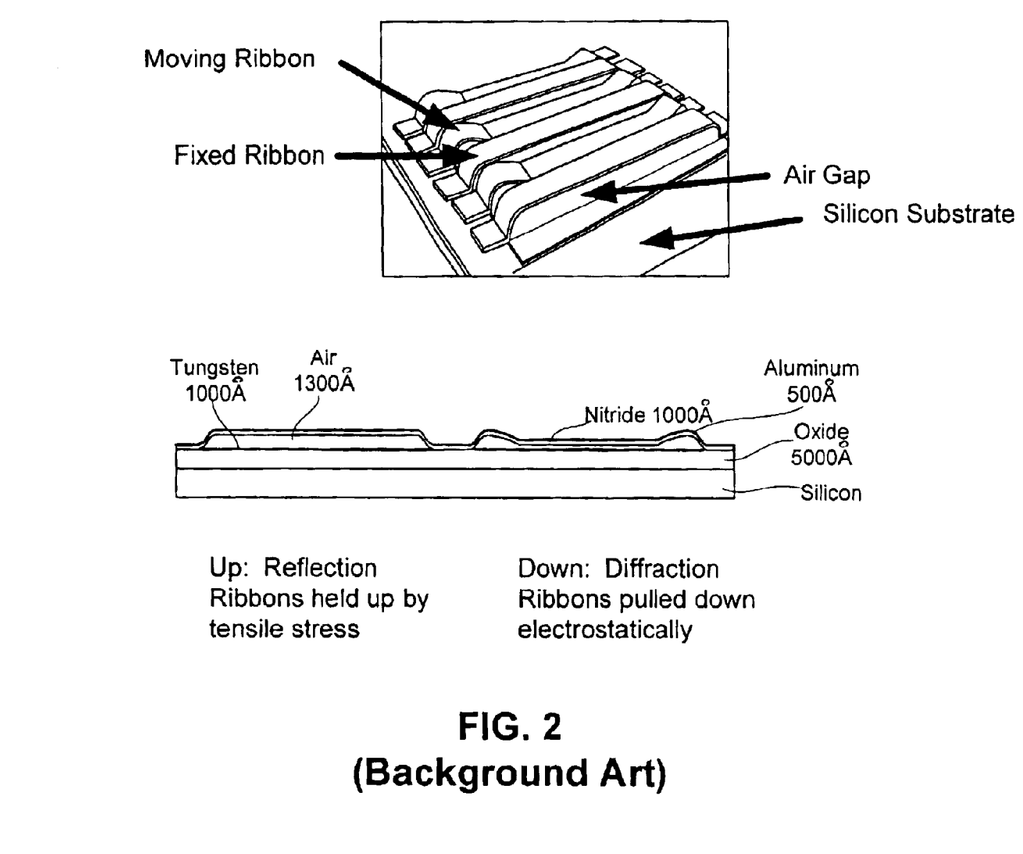
FIG. 2 is an illustration depicting a conventional GLV element comprising pairs of fixed and movable ribbons.

As depicted in FIG. 2, the conventional GLV element may include pairs of reflective ribbons, each pair having one fixed and one movable ribbon.

Figure 3:
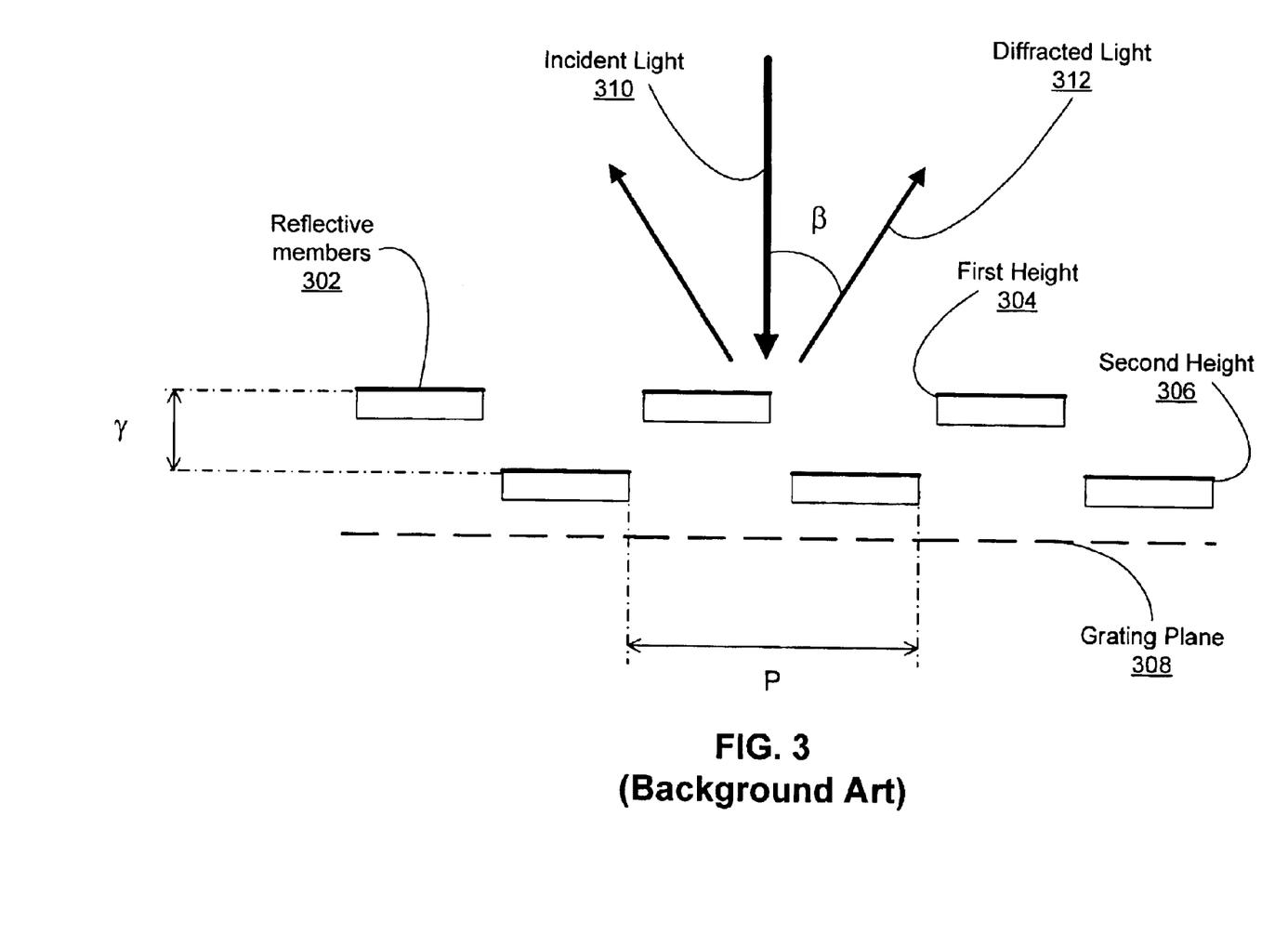
FIG. 3 is a diagram depicting deflections of reflective members for a conventional GLV element in diffractive state.

FIG. 3 is a diagram depicting deflections of reflective members for a conventional GLV element in a diffractive state. The conventional GLV element comprises a plurality of reflective members 302. In the example illustrated, the GLV element includes three pairs of reflective members 302 (i.e. six of them).

In the diffractive state, the reflective members are controllably arranged in an alternating configuration at two heights (304 and 306) with respect to the grating plane 308. A first height 304 may be positioned farther from the grating plane 308, while the second height 306 may be displaced closer to the grating plane 308. For example, as shown in FIG. 2, the reflective members at the first height may comprise fixed reflective ribbons, while the reflective members at the second height may comprise movable reflective ribbons.

The grating plane 308 is a theoretical plane that corresponds to the plane on or about which the reflective members are aligned. As illustrated in FIG. 3, the incident light beam 310 impinges upon the element at an angle perpendicular to the grating plane 308. Diffracted light 312 travels away from the element.

The difference between first and second heights may be defined as the deflection distance $\gamma$. The amount of the deflection $\gamma$ may be varied to control the amount of incident light reflected from the element. When $\gamma$ is near zero, the element would be near a maximally reflective state. When $\gamma$ is near $\lambda/4$, where $\lambda$ is the wavelength of the incident light, the element would be near a maximally diffractive state.

With some simplification, when $\gamma$ is near $\lambda/4$, the diffracted light 312 may be considered as traveling outward at an angle $\beta$ with respect to the incident light 310. Making some approximations, $\beta = \arcsin(\lambda/P)$, where P is the pitch of the pairs of reflective members (i.e. the horizontal distance between the beginning of one pair and the beginning of the next pair) when the incident light beam 310 impinges upon the element at an angle perpendicular to the grating plane 308.

Figure 4:
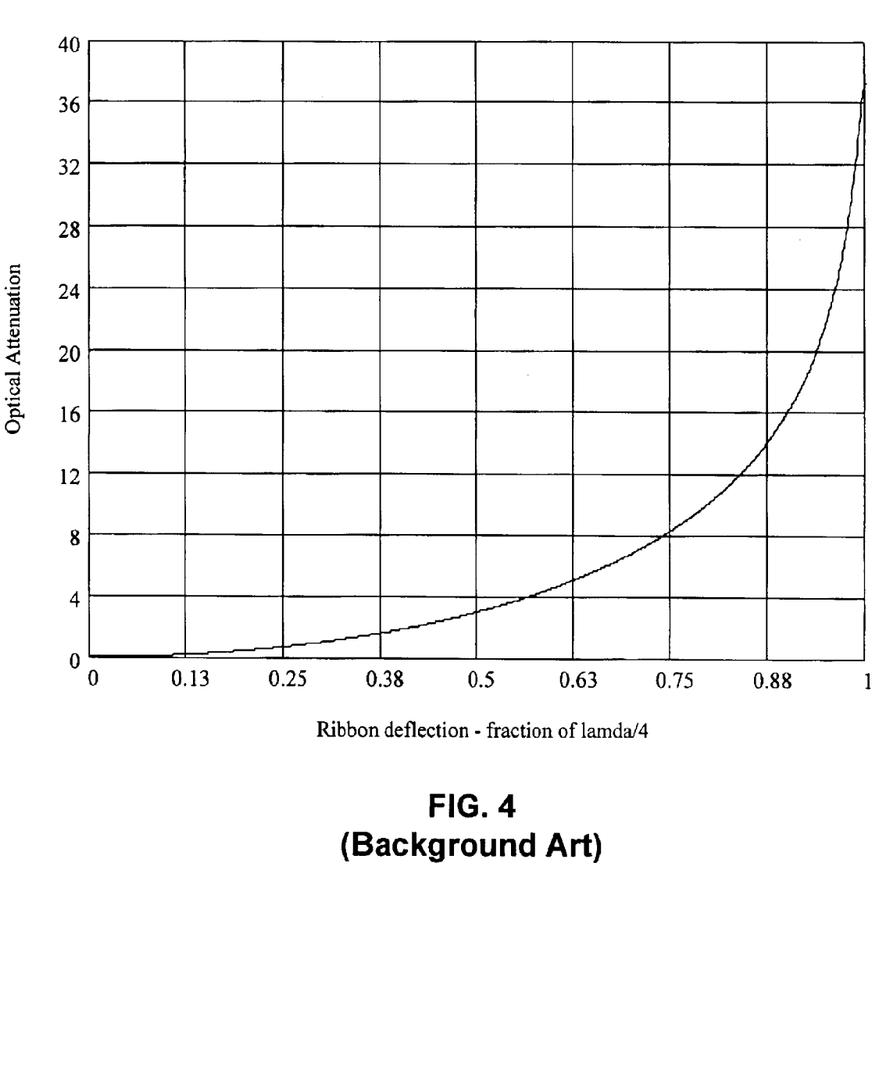
FIG. 4 is a graph illustrating a non-linear optical response for a conventional GLV element.

FIG. 4 is a graph illustrating a non-linear optical response for a conventional GLV element as a function of amount of deflection, $\gamma$. The graph shows intensity of light (in arbitrary units) versus $\gamma$ (from 0 to $\lambda/4$). As the deflection ($\gamma$) increases from 0 to $\lambda/4$ the intensity of light decreases. The decrease in intensity of light with deflection is highly non-linear and the rate (slope) of decrease in the intensity of light increases with the increase in deflection (γ) increases from 0 to λ/4. If the optical response were linear, then the graph would show a straight line. However, as shown in FIG. 4, the optical response is disadvantageously non-linear.

SUMMARY

One embodiment of the invention relates to an apparatus for controlled diffraction of light. The apparatus includes a plurality of vertically movable reflective members and an arrangement of the reflective members along a grating plane. The grating plane is configured to be controllably tilted.

Another embodiment of the invention relates to a method for controlled diffraction of light. The method includes illuminating incident light upon an element, and controllably deflecting reflective members within the element to control a fraction of the incident light reflected by the element. The reflective members may be controllably deflected so as to be positioned along a tiltable grating plane.

Another embodiment of the invention relates to a micromechanical phase grating system. The system includes a means for controllably deflecting reflective members within an element to control a fraction of incident light reflected by the element. The reflective members are controllably deflected so as to be positioned along a tiltable grating plane that provides a more linear electro-optic response than an untiltable grating plane.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not to scale unless otherwise noted.

DETAILED DESCRIPTION

Figure 5:
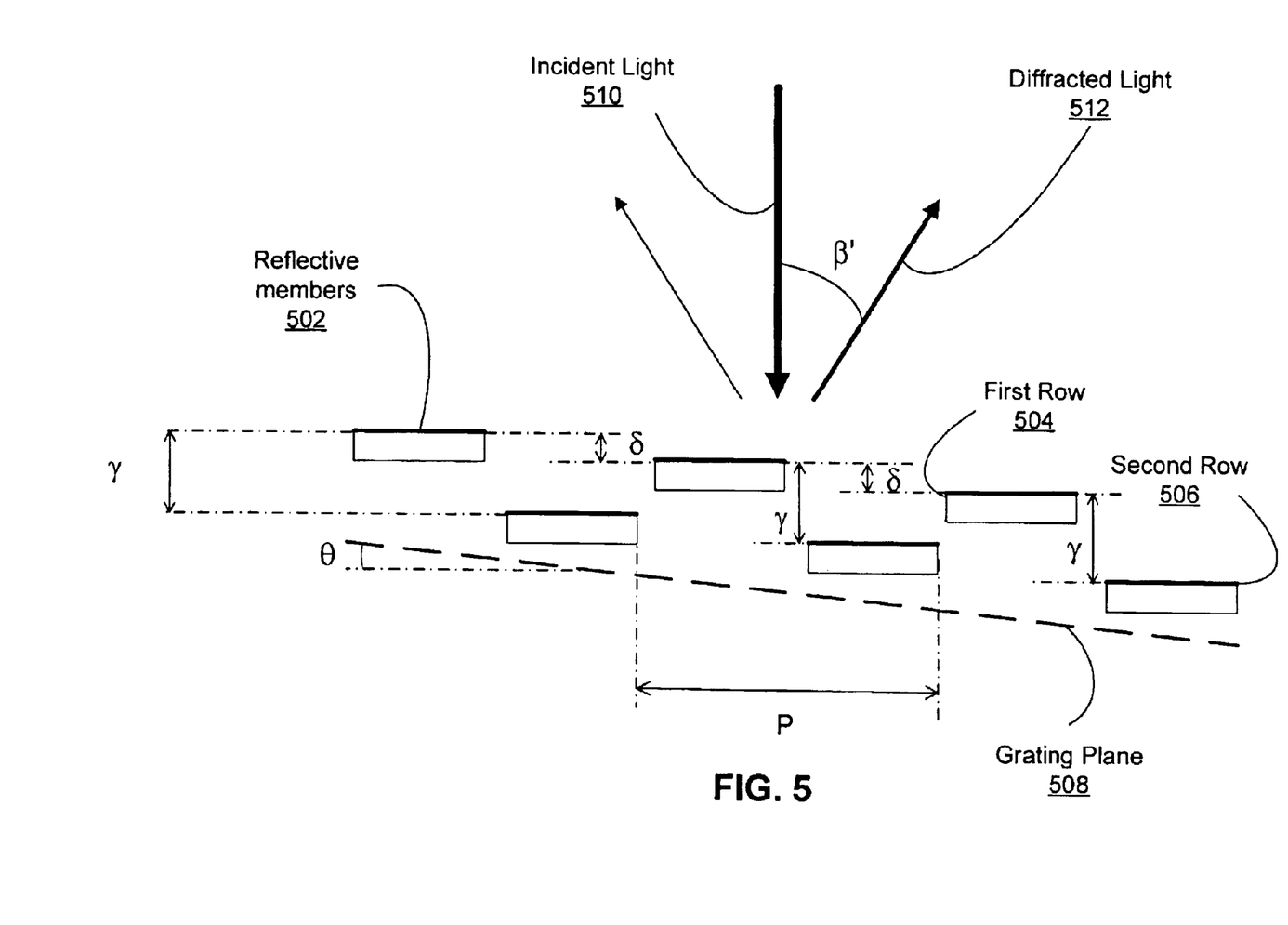
FIG. 5 is a diagram depicting deflections of reflective members for a tiltable grating plane GLV element in a diffractive state in accordance with an embodiment of the invention.

FIG. 5 is a diagram depicting deflections of reflective members for a tiltable grating plane GLV element in a diffractive state in accordance with an embodiment of the invention. The tiltable grating plane GLV element comprises a plurality of reflective members 502. In the embodiment illustrated, the GLV element includes three pairs of reflective members 502 (i.e. six of them). Of course, in other embodiments, other numbers of reflective members 502 may be used per element.

Like the conventional GLV element, when in the diffractive state, the reflective members are controllably arranged in an alternating configuration in two rows (504 and 506) that are displaced at different heights with respect to the grating plane 508. A first row 504 may be positioned farther from the grating plane 308, while the second row 506 may be displaced closer to the grating plane 508.

However, unlike the conventional GLV element, each pair of reflective members is displaced vertically by distance δ with respect to the previous pair. For example, as shown in FIG. 5, the second (middle) pair is lower by δ than the first (left) pair, and the third (right) pair is lower by 2δ than the first pair. Because of this, the reflective members in the first (top) row 504 cannot all comprise fixed ribbons because at least some of them must move when going from the reflective state to the diffractive state.

As illustrated in FIG. 5, when the element is in the diffractive state, the grating plane is tilted by angle θ=arctan (δ/P), so the incident light beam 510 impinges upon the element at a non-perpendicular angle to the grating plane 508 although still at a perpendicular angle to the GLV substrate plane. In one embodiment of the invention, the amount of the displacement δ between neighboring pairs of reflective members is linearly dependent upon the amount of the displacement γ between the members within a pair of reflective members. For example, in a specific implementation, δ may be equal to γ multiplied by a constant k, where k=½.

With some simplification, when γ is near λ/4 (and δ is a proportional amount), the diffracted light 512 may be considered as traveling outward at an angle β' with respect to the incident light 510. Making some approximations, β'=arcsin (λ/P−sin θ), where λ is the wavelength of the incident light and P is the pitch of the pairs of reflective members.

Advantageously, the optical response for the tiltable grating plane GLV element may be made more linear in comparison to the highly non-linear electro-optic response of the conventional GLV element. This advantage is shown by the graphs in FIG. 6

Figure 6:
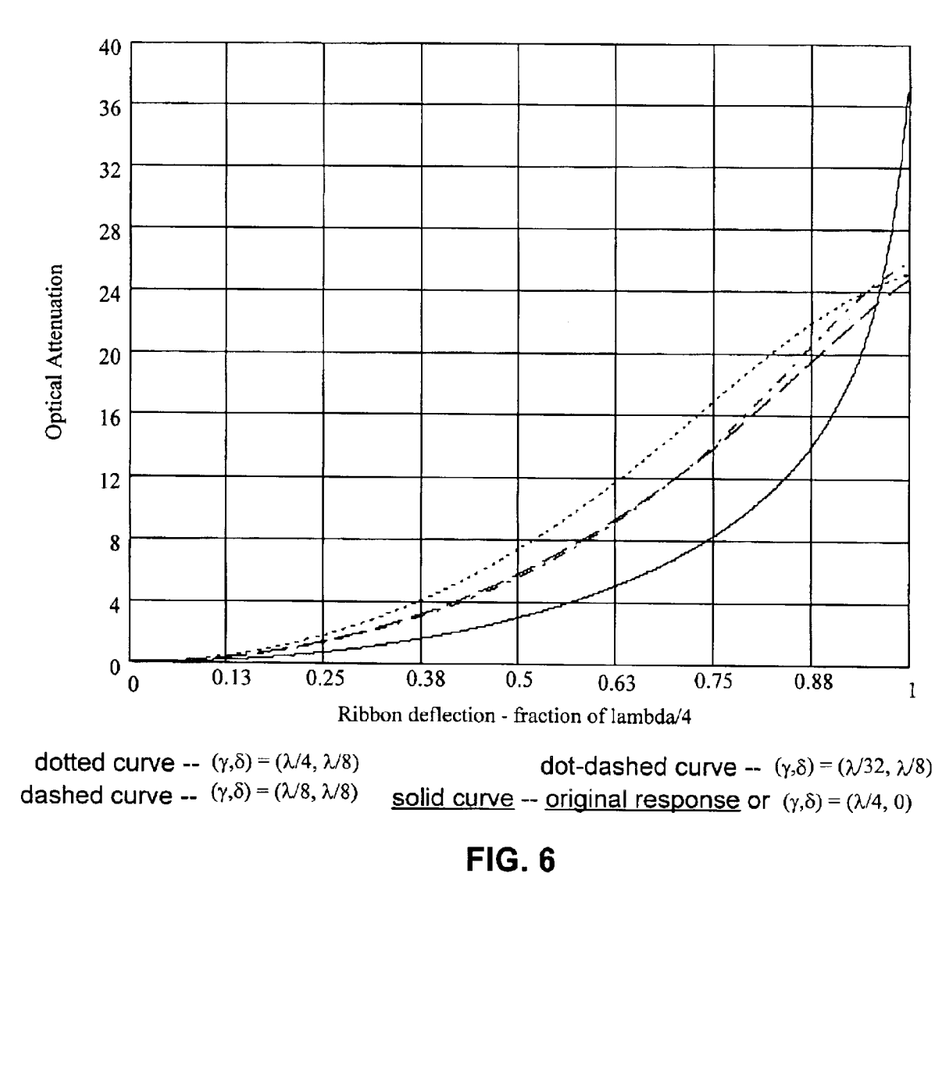
FIG. 6 is a graph illustrating the optical response for a conventional GLV element and optical responses for tiltable grating plane GLV elements in accordance with an embodiment of the invention

FIG. 6 is a graph illustrating the optical response for a conventional GLV element and optical responses for tiltable grating plane GLV elements in accordance with an embodiment of the invention. The optical response for the conventional GLV element is shown by the solid curve. The optical responses for the tiltable grating plane GLV elements are shown by the dotted curve, the dashed curve, and the dot-dashed curve.

The optical response for the conventional GLV element (solid curve) may be considered as being obtained from a system with maximum γ=λ/4 and with corresponding maximum δ=0. The optical responses for the tiltable grating plane GLV element are obtained from systems: i) with maximum γ=λ/4 and with corresponding maximum δ=λ/8 (dotted curve); ii) with maximum γ=λ/8 and with corresponding maximum δ=λ/8 (dashed curve); and iii) with maximum γ=λ/32 and with corresponding maximum δ=λ/8 (dot-dashed curve). Off course the invention may also be used with other values.

The less non-linear (more linear) optical responses in accordance with the present invention enables higher attenuation resolution and lower susceptibility to noise. This is because the non-linear optical response of the conventional GLV element is typically compensated for by electronic linearization of the transfer function. For a given electronic linearization implementation, the less non-linear the optical response the higher is the attenuation resolution. Conversely, for identical attenuation resolution, a less non-linear optical response requires less electronic linearization resources. Irrespective of the mechanism of electronic linearization, the optical attenuation noise due to electronic or mechanical noise always follows the optical response; the more non-linear the optical response the higher is the optical noise for a given magnitude of electronic or mechanical noise.

Figure 7:
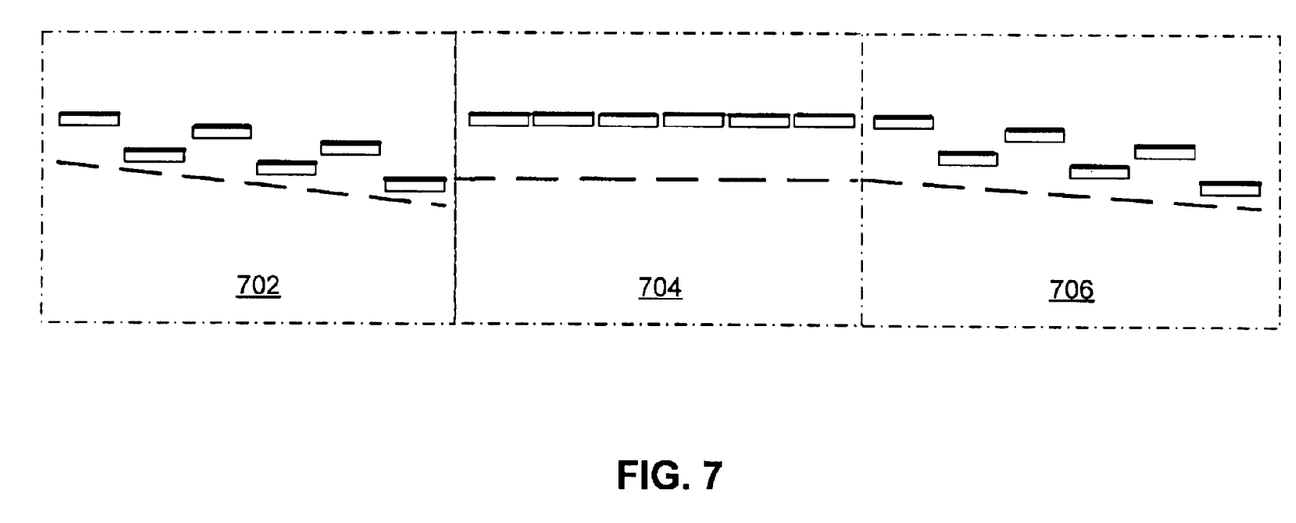
FIG. 7 is a diagram illustrating a plurality of tiltable grating plane GLV elements in accordance with an embodiment of the present invention.

FIG. 7 is a diagram illustrating a plurality of tiltable grating plane GLV elements in accordance with an embodiment of the present invention. Three tiltable grating plane GLV elements (702, 704, and 706) are shown that may be, for example, part of a linear array of GLV elements. In the example illustrated, the left element 702 is in a diffractive state, the middle element 704 is in a reflective state, and the right element 706 is in a diffractive state. As illustrated in FIG. 7, each individual element (pixel) has a grating plane that may be tilted if that element is in a diffractive state, and tilting of one element's grating plane does not affect the tilting or non-tilting of the grating plane of the other elements.

Persons of ordinary skill in the art will recognize, that although the aforementioned embodiment describes the case when the incident light beam is perpendicular to the plane of the GLV substrate, the invention includes also the case when the incident light beam is not perpendicular to the plane of the GLV substrate.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. An apparatus for controlled diffraction of light, the apparatus comprising:
   a plurality of vertically movable reflective members; and
   an arrangement of the reflective members along a grating plane,
   wherein the grating plane is configured to be controllably tilted,
   wherein the plurality of reflective members are grouped into an addressable element,
   wherein, when the element is in a diffractive state, the grating plane is tilted with respect to a substrate plane, and the reflective members of the element are controllably arranged in an alternating figuration at two heights with respect to the tilted grating plane.

2. The apparatus of claim 1, wherein the grating plane is controllably tilted by deflecting the reflective members so that the members are arranged along a tilted grating plane.

3. The apparatus of claim 1, wherein the apparatus comprises multiple addressable elements arranged in an array.

4. The apparatus of claim 1, wherein the controllably tilted grating plane provides a more linear optical response than an un-tilted grating plane.

5. The apparatus of claim 1, wherein each reflective member comprises a movable micro electromechanical ribbon.

6. An apparatus for controlled diffraction of light, the apparatus comprising:
   a plurality of vertically movable reflective members; and
   an arrangement of the reflective members along a grating plane,
   wherein the grating plane is configured to be controllably tilted,
   wherein the plurality of reflective members are grouped into an addressable element,
   wherein, when the element is in the reflective state, the grating plane is parallel to a substrate plane, and the reflective members of the element are arranged in a single plane.

7. A method for controlled diffraction of light, the method comprising:
   illuminating incident light upon an element; and
   controllably deflecting reflective members within the element to control a fraction of the incident light reflected by the element,
   wherein the reflective members are controllably deflected so as to be positioned along a tiltable grating plane, and
   wherein, when the element is in a diffractive state, the grating plane is tilted with respect to a substrate plane, and the reflective members of the element are positioned in an alternating configuration at two heights with respect to the tilted grating plane.

8. The method of claim 7, wherein the controllably tilted grating plane provides a more linear optical response than an untiltable grating plane.

9. The method of claim 8, wherein the elements comprise grating light valve type devices.

10. A method for controlled diffraction of light, the method comprising:
    illuminating incident light upon an element; and
    controllably deflecting reflective members within the element to control a fraction of the incident light reflected by the element,
    wherein the reflective members are controllably deflected so as to be positioned along a tiltable grating plane, and
    wherein, when the element is in the reflective state, the grating plane is parallel to a substrate plane, and the reflective members are arranged in a single plane.

11. A micromechanical phase grating system, the system comprising:
    means for controllably deflecting reflective members within an element to control a fraction of incident light reflected by the element,
    wherein the reflective members are controllably deflected so as to be positioned along a tiltable grating plane that provides a more linear optical response than an untiltable grating plane, and
    wherein, when the element is in a diffractive state, the grating plane is tilted with respect to a substrate plane, and the reflective members of the element are positioned in an alternating configuration at two heights with respect to the tilted grating plane.

12. The micromechanical system of claim 11, wherein each reflective member comprises a movable micro electromechanical ribbon.

13. The micromechanical system of claim 11, wherein multiple elements are arranged in an array, and wherein the multiple elements are electronically addressable.

* * * * *